United States Patent [19]
Pignatello

[11] Patent Number: 6,160,194
[45] Date of Patent: Dec. 12, 2000

[54] SOIL DECONTAMINATION USING FERRIC CHELATES AND PEROXIDE

[75] Inventor: Joseph J. Pignatello, Hamden, Conn.

[73] Assignee: The Connecticut Agricultural Experiment Station, New Haven, Conn.

[21] Appl. No.: 08/118,128

[22] Filed: Sep. 8, 1993

[51] Int. Cl.[7] .................................. A62D 3/00; C02F 1/72
[52] U.S. Cl. ...................... 588/205; 588/206; 588/207; 210/759; 210/908; 210/909
[58] Field of Search ...................... 588/205, 206, 588/207, 210; 210/759, 908, 909

[56] References Cited

U.S. PATENT DOCUMENTS

| | | |
|---|---|---|
| 5,043,000 | 8/1991 | Cater et al. . |
| 5,232,484 | 8/1993 | Pignatello . |

OTHER PUBLICATIONS

Leung, S.W., J. Environ. Qual. 21: 377–381 (1992).
Masten, S.J., Ozone Sci. Engineer. 13: 287–312 (1991).
Pardieck, D.L., et al., J. Contam. Hydrol. 9: 221–242 (1992).
Sun, Y. and Pignatello, J.J., J. Agr. Food Chem. 40: 322–327 (1992).
Tyre, B.W., et al, J. Environ. Qual. 20: 832–838 (1991).
Joseph J. Pignatello et al., "Ferric Compounds as Catalysts for 'Fenton' Degradation of 2,4–D and Metolachlor in Soil", *Journal of Environmental Quality*, vol. 23, No. 2, Mar.–Apr. 1994, pp. 365–70.

*Primary Examiner*—Steven Bos
*Attorney, Agent, or Firm*—Todd E. Garabedian; Dale L. Carlson; Wiggin & Dana

[57] ABSTRACT

Soluble ferric chelates and peroxide are employed in a method for degrading organic contaminants such as pesticides in soil. In the practice of the method, soil containing an organic compound having at least one oxidizable aliphatic or aromatic functional group is contacted with an active ferric chelate and a peroxide such as hydrogen peroxide in amounts effective to achieve degradation of the compound in the presence of water at the pH of the soil. In preferred embodiments, at least about 3%, and in some cases at least about 5% or 10%, of the ferric chelate does not sorb to the soil. Example ferric chelates include ferric nitrilotriacetate, ferric hydroxyethyleniminodiacetate, ferric gallate, and mixtures thereof; ferric nitrilotriacetate and ferric hydroxyethyleniminodiacetate are especially preferred in some embodiments.

28 Claims, 6 Drawing Sheets

SOIL DECONTAMINATION USING FERRIC CHELATES AND PEROXIDE

DESCRIPTION

TECHNICAL FIELD

This invention relates to the degradation of organic pesticides in soil using ferric chelates and peroxide.

BACKGROUND OF THE INVENTION

Soil containing toxic organic chemicals such as chlorinated aromatic hydrocarbons and organophosphorus and organo-nitrogen compounds must sometimes be decontaminated to safeguard water supplies and public health. Remediation is occasionally required, for example, for agricultural pesticides spilled accidentally or over the course of time from improper handling practices. Large-scale spills occur infrequently but require immediate and serious attention. Soil contaminated by repeated contact with concentrates, batch mixes or rinsates is a more insidious problem because applicators often carry out mixing and equipment filling and rinsing operations at the same site on farms and at agrochemical dealerships year after year. Where the pesticides are not only toxic but refractory or persistent, the hazards are compounded.

Research on soil decontamination has focused on bioremediation and physical removal. Many compounds that are significant subsurface soil contaminants such as benzene, toluene, xylenes and alkylbenzenes that enter the ground from gasoline or solvent spills, components of diesel or heating oil such as naphthalane, fluorene, dibenzofuran and other polynuclear aromatic compounds, and halogenated compounds such as chlorobenzene, chlorophenols, and methylene chloride can be biodegraded under aerobic conditions (see, for example, Pardieck, D. L., et al., *J. Contam. Hydrol.* 9: 221–242 (1992)). Bioremediation is inhibited at high concentrations characteristic of spills, however, and the technique can be limited by survivability of the inocula and pollutant bioavailablity in long-contaminated environments. Moreover, the availability of oxygen for aerobic metabolism is limited in many contaminated soils due to the relatively low solubility of oxygen in groundwater, the slow rate of re-aeration of ground water in the saturated zone, and the significant biological oxygen demand exerted by contaminants in the subsurface (id. at page 222). In addition, the transformation of some important pollutants such as low-molecular-weight halogenated aliphatics and certain pesticides appear to be favored by anaerobic rather than aerobic conditions (ibid.).

From a practical standpoint, physical removal of semi-volatile or non-volatile compounds in the vadose zone is limited to excavation followed by soil washing. Recovered pollutants must be disposed of or destroyed. Many of the compounds that do not degrade pose a threat to biota and/or human populations.

Chemical treatment using non-polluting reagents offers advantages over bioremediation or physical removal. Chemical oxidation by ozone or hydrogen peroxide has been suggested for wastewater decontamination (see, for example, U.S. Pat. No. 5,043,000 to Cater, et al., and U.S. Pat. No. 5,232,484 to Pignatello), and ozone has been suggested to oxidize certain chlorinated organic compounds in the presence of soil or dissolved humic acid (Masten, S. J., *Ozone Sci. Engineer.* 13: 287–312 (1991)). In soil, however, consumption and/or decomposition of oxidant by soil components, especially soil organic matter, can make complete oxidation uneconomical. Nevertheless, removal of the parent contaminant may be sufficient if byproducts are less toxic or more readlily degraded by indigenous soil microbes.

Fenton-type systems employing ferrous salts and hydrogen peroxide in acidified soil suspensions (pH ~2 to 3) have been studied as potential oxidants of soil contaminants (Tyre, B. W., et al., *J. Environ. Qual.* 20: 832–838 (1991) and Leung, S. W., *J. Environ. Qual.* 21: 377–381 (1992)). For example, pentachlorophenol and trifluralin were shown to be extensively degraded in soil suspensions when treated with $\sim 4 \times 10^{-3}$ M ferrous ion and 3.5 M (120 g/L) hydrogen peroxide; hexadecane and dieldrin were partially transformed under similar conditions (Tyre, et al., cited above). Tetrachloroethene was mineralized in silica sand suspensions treated with $5 \times 10^{-3}$ M ferrous ion and 2.1 M hydrogen peroxide (Leung, et al., cited above).

In the classic Fenton reaction, ferrous ion rapidly reduces hydrogen peroxide to an hydroxyl radical. A disadvantage of using ferrous ion is that it is required in stoichiometric amounts. Peroxide demand and therefore ferrous ion demand can be high due to competitive oxidation of soil organic matter and soil-catalyzed decomposition. A further disadvantage of ferrous ion is that it is oxidized by hydroxyl radicals and therefore it competes with the target compounds unless its concentration is kept low by gradual addition in dilute form.

Ferric ion may also produce hydroxyl radicals from peroxide, albeit at a slower rate than ferrous ion. However, the use of ferric ion requires acidic conditions to keep the iron soluble; the reaction has a pH optimum of about 3. In soil decontamination, the need to acidify the soil is a serious drawback to use of ferric ion. Acidification to an optimum pH of 3 is difficult and clumsy because soil has a high buffering capacity. Moreover, acidification itself can be viewed as a polluting practice unless the soil were excavated for treatment and neutralized before replacement.

SUMMARY OF THE INVENTION

It is an object of the present invention to provide a new method for degrading organic contaminants in soil.

It is a more specific object of the present invention to provide a chemical method of soil decontamination using non-polluting reagents in a reaction that can be carried out under mild conditions at the pH of the soil.

These and other objects are achieved by the present invention, which describes methods of decontamining soil containing organic compounds having oxidizable aliphatic or aromatic functional groups, notably aromatics, under mild conditions using chelated ferric reagents without acidification of the decontamination reaction medium. In the practice of the method, soil containing an organic compound having at least one oxidizable aliphatic or aromatic functional group such as a pesticide is contacted with an active, soluble ferric chelate and an oxidizing agent such as a peroxide in amounts effective to achieve degradation of the soil compound in the presence of water at the pH of the soil. In preferred embodiments, at least about 3%, and in some cases at least about 5% or 10% of the ferric chelate does not sorb to the soil.

Example ferric chelates include ferric nitrilotriacetate (Fe(III)-NTA), ferric hydroxyethyleniminodiacetate (Fe(III)-HEIDA), ferric gallate (Fe(III)-GAL), and mixtures thereof; Fe(III)-NTA and Fe(III)-HEIDA are preferred in some embodiments. In these embodiments, as little as about 0.01 mole ferric chelate per kilogram dry soil is effective.

The concentration of hydrogen peroxide typically ranges between about 0.3 to 1.0 mole hydrogen peroxide per kilogram dry soil; about 0.5 mole per kilogram dry soil is employed in one embodiment.

BRIEF DESCRIPTION OF THE FIGURES

FIGS. 1, 3, and 5 depict ring-$^{14}C$ distributions using Fe(III)-GAL, Fe(III)-HEIDA, and Fe(III)-NTA, respectively. FIGS. 2, 4, and 6 depict carboxy-$^{14}C$-labelled distributions using Fe(III)-GAL, Fe(III)-HEIDA, and Fe(III)-NTA, respectively.

DETAILED DESCRIPTION OF THE INVENTION

Figure 1:
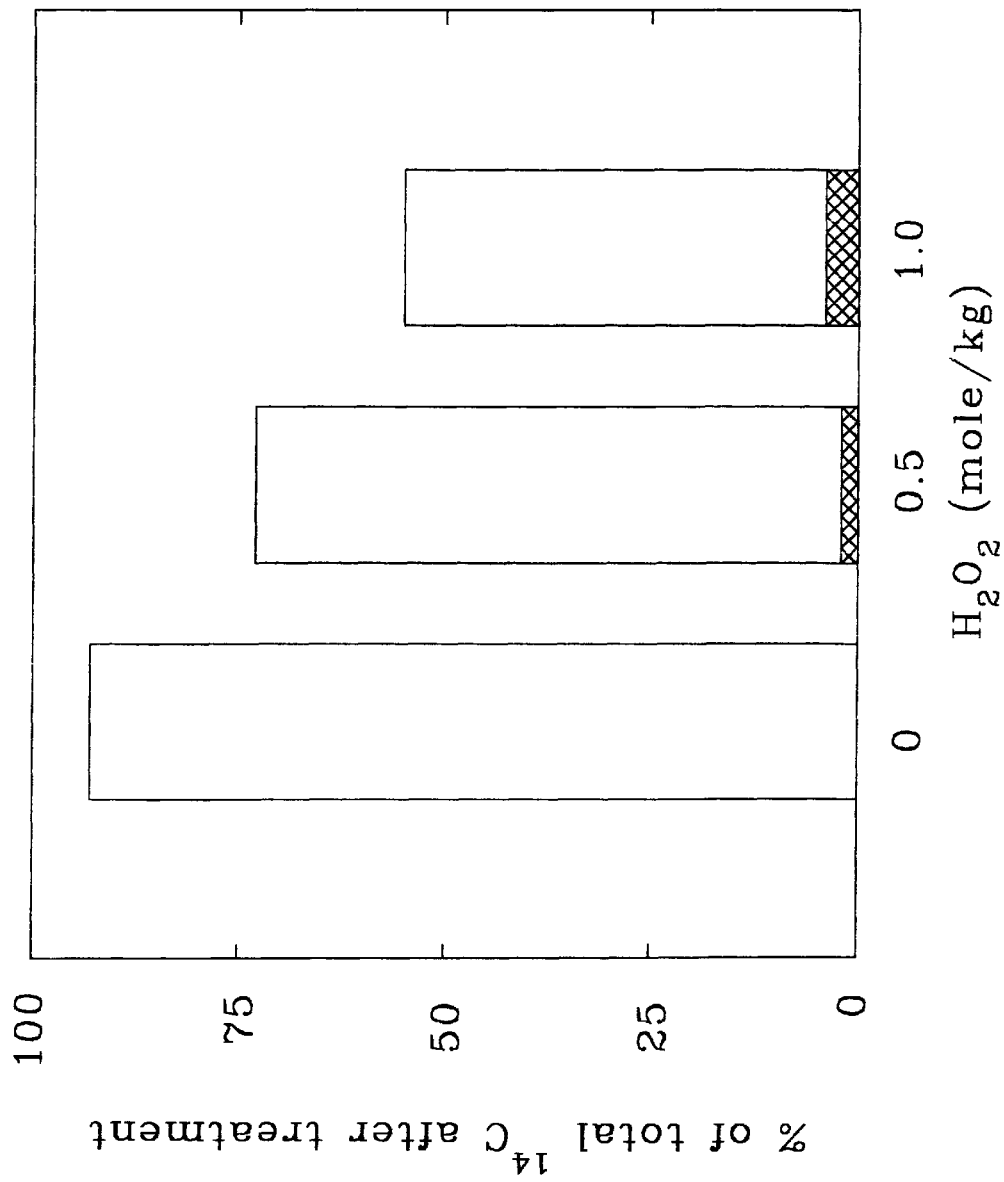
FIGS. 1 to 6 are stacked bar graph depictions showing the distribution of $^{14}C$-label between $CO_2$ (hatched) and methanol-extractable (open) products following degradation of ring- and carboxy-$^{14}C$-labelled 2,4-dichlorophenoxyacetic acid in soil (2000 mg/kg) with iron chelates (0.01 mole/kg dry soil) and hydrogen peroxide (concentration=0.5 mole/kg dry soil).
Figure 2:
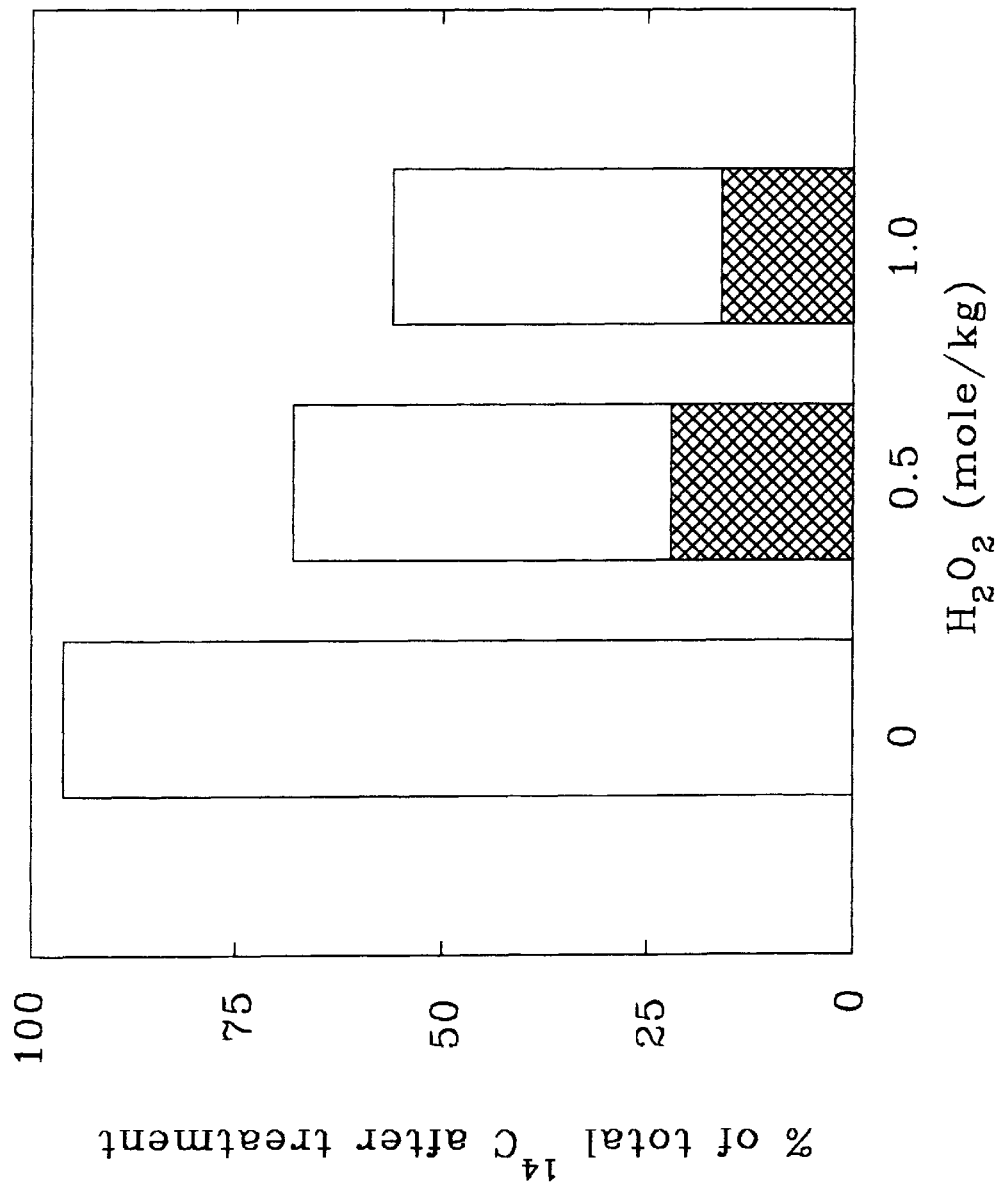
Figure 3:
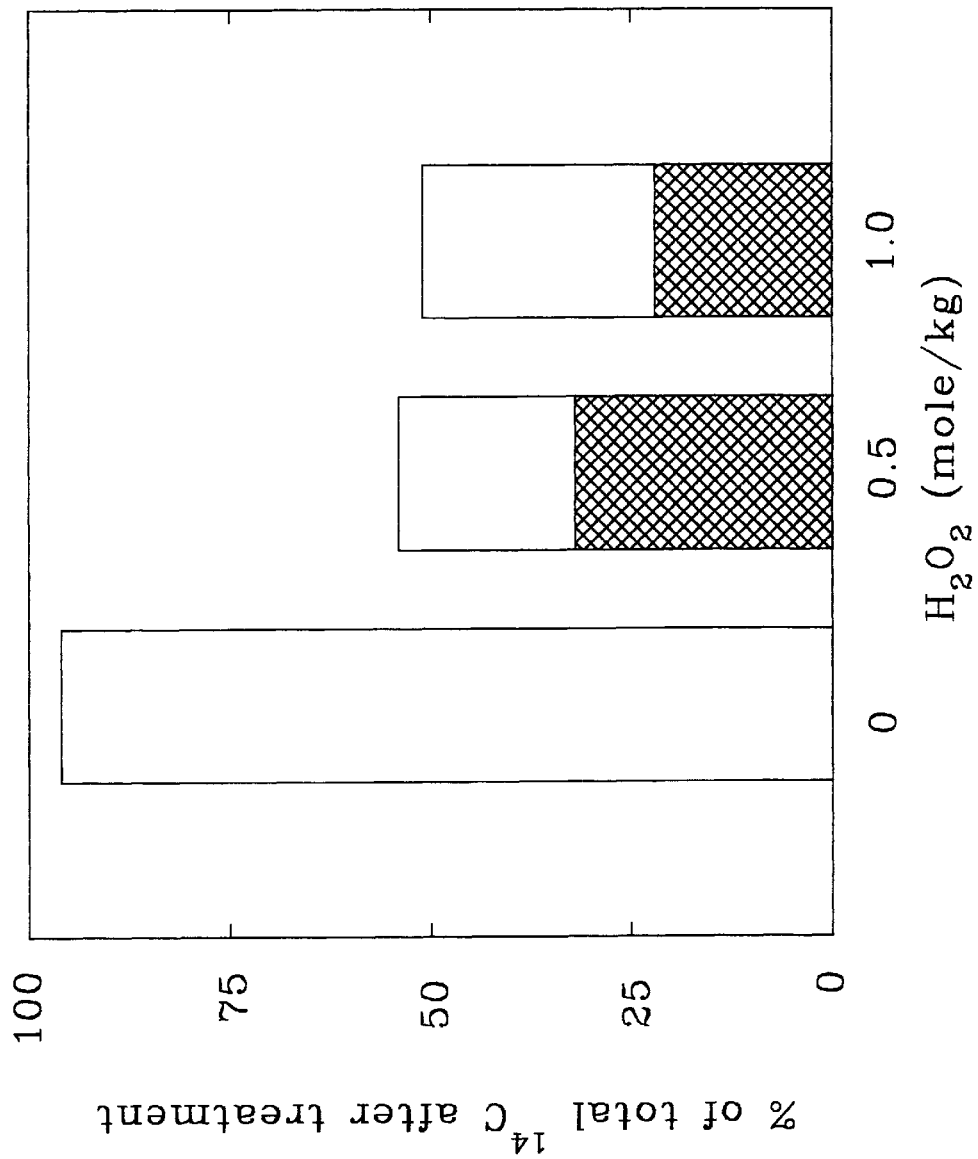
Figure 4:
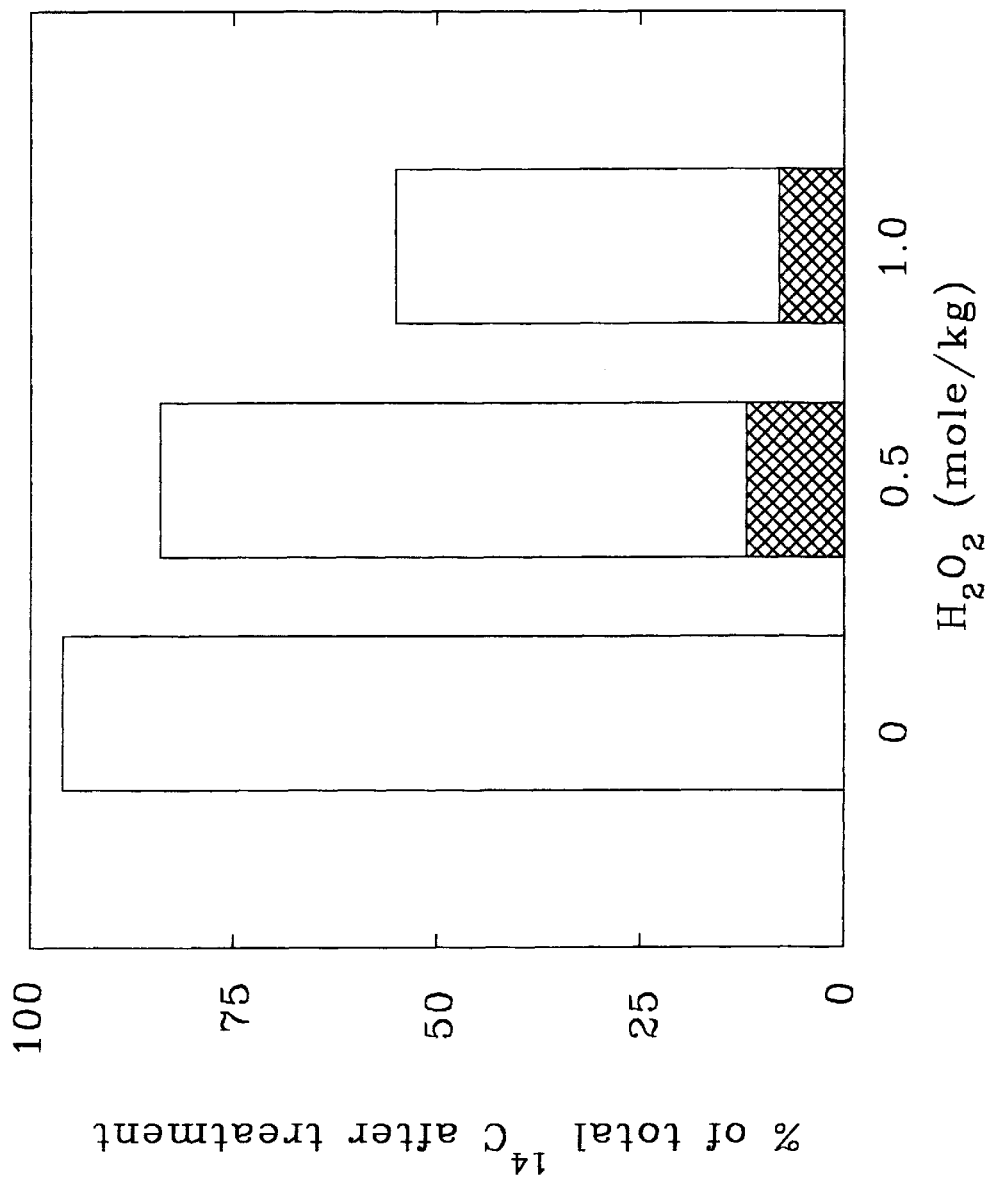
Figure 5:
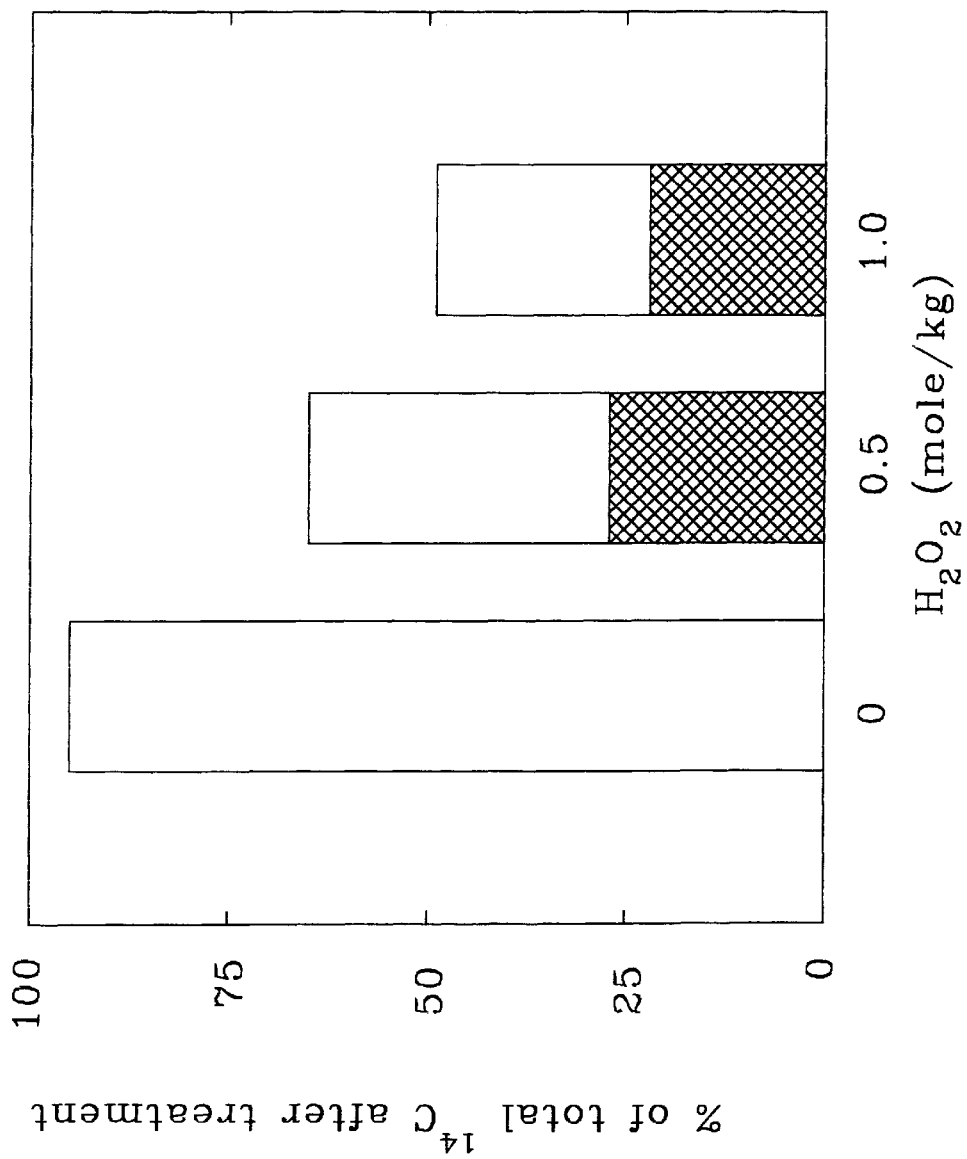
Figure 6:
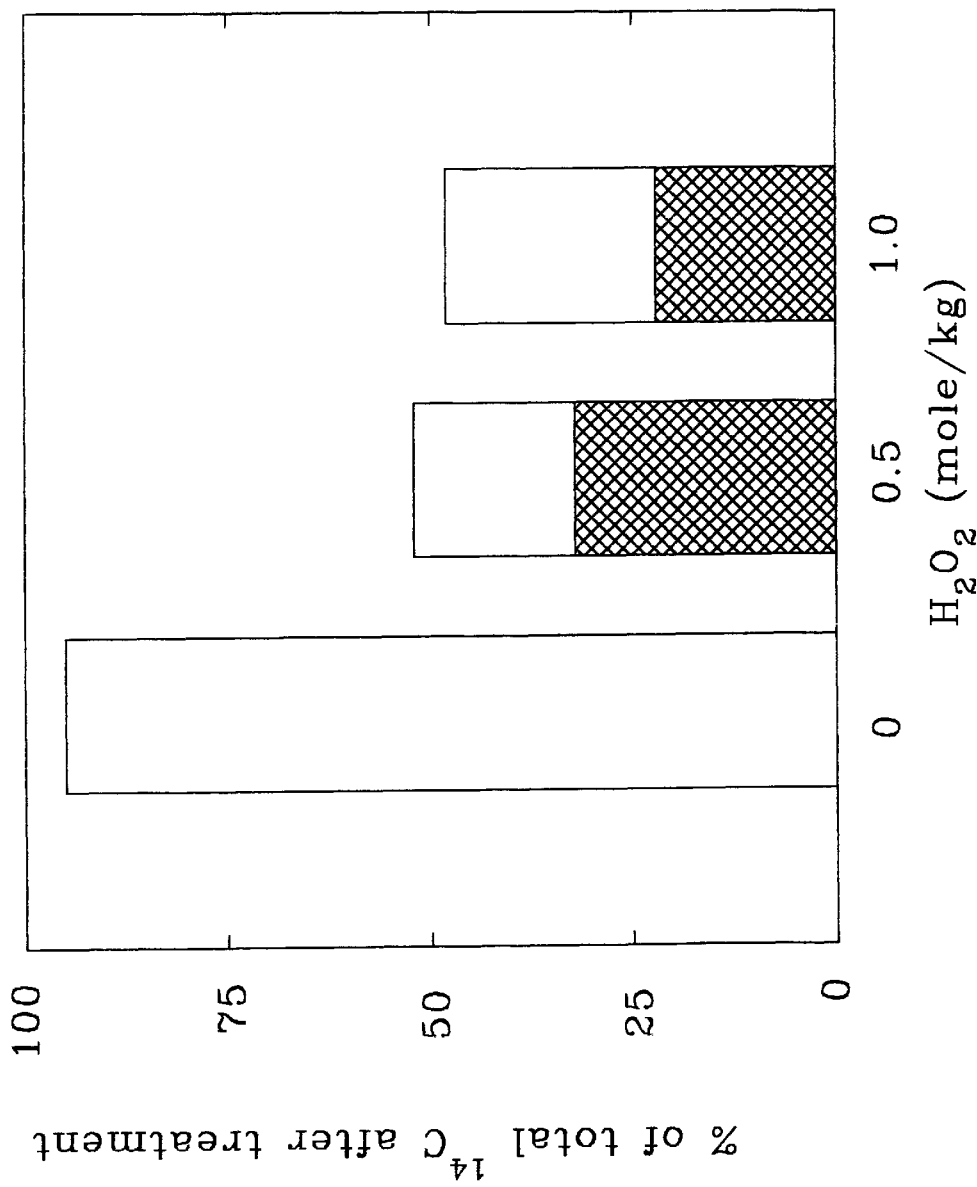

This invention is based upon the finding that certain ferric complexes and peroxide can be employed to degrade soil contaminants in an aqueous environment at the pH of the soil.

In the practice of the invention, soil containing an organic compound having at least one oxidizable aliphatic or aromatic functional group such as a pesticide is contacted with an active, soluble ferric chelate and an oxidizing agent such as a peroxide in amounts effective to achieve degradation of the target compound in the presence of water at the pH of the soil.

By "ferric chelate" is meant any one of a number of organic and inorganic polydentate ligands complexed with ferric ion, Fe(III), as previously described (Sun, Y., and Pignatello, J. J., *J. Agr. Food Chem.* 40: 322–327 (1992), herein incorporated in its entirety by reference). Active ferric chelates that are soluble at the pH of the soil are useful in the method of the invention. As denoted herein, an "active" ferric chelate is one that exhibits catalytic activity toward oxidation of the compound to be degraded, i.e., capable of generating an hydroxyl radical or other reactive oxidant from the peroxide in the presence of soil.

As set out in the Sun and Pignatello paper cited above, activity is determined experimentally by comparing, at circumneutral pH, degradation using the ferric chelate with a control consisting of precipitated Fe(III) in the absence of ligand. Highly active ferric chelates as defined therein are preferred; these are measured in a comparison of the effectiveness of the removal of a known pesticide such as 2,4-dichlorophenoxyacetic acid (2,4-D) in an hour. Example active, soluble ferric chelates include, but are not limited to, complexes of hydroxyethyliminodiacetic acid (HEIDA), nitrilotriacetic acid (NTA), hexaketocyclohexane (HKCH), tetrahydroxy-1,4-quinone, gallic acid, rhodizonic acid, and picolinic acid with ferric ion, and mixtures thereof. In some embodiments, the ferric chelate is selected from the group consisting of ferric nitrilotriacetate, ferric hydroxyethyleniminodiacetate, ferric gallate, and mixtures thereof.

In some embodiments, active, soluble ferric chelates that do not exhibit extensive sorption to the soil are preferred, and these chelates are not necessarily those preferred in aqueous solutions in the absence of soil. By "sorption" is meant taking up and holding by adsorption and/or absorption. For these embodiments, at least about 3%, preferably at least about 5%, of the ferric chelate does not sorb to the soil. In one embodiment, at least about 10% of the ferric chelate does not sorb to the soil. In some embodiments, ferric nitrilotriacetate and ferric hydroxyethyleniminodiacetate are especially preferred.

Preferred ferric chelates are environmentally safe, i.e., do not themselves add to the contamination of the soil to be decontaminated. An advantage of the invention is that the ferric/peroxide combination itself oxidizes the chelating ligand in preferred embodiments, but only after the soluble, catalytically active iron has degraded the target compound substantially. Destruction of the ligand alleviates concerns about the introduction of another waste component into the system.

Ferric chelates useful in the invention can be prepared using any method known to the skilled artisan. One simple method is directly mixing aqueous solutions of a ferric salt such as ferric perchlorate with the corresponding ligand. Example ferric chelate preparations are given hereinafter (and may also be found in the Sun and Pignatello paper cited above).

It is an advantage of the invention that the chelates leach native iron out of soil. This property enhances the degradation method. The treatment of iron-rich soils requires less added iron. In some cases, the soil may contain sufficient iron to provide ferric chelates for degradation in the absence of added Fe(III).

Active, soluble ferric chelates are used in combination with an oxidizing agent such as a peroxide in concentrations effective to degrade the target compound. Hydrogen peroxide is especially preferred. The amount required depends upon the concentration of soil pesticide to be degraded, and can also depend upon the natural organic matter content of the soil. Where the concentration of ferric chelate is about 0.01 moles per kilogram dry soil, for example, hydrogen peroxide concentrations ranging from about 0.3 to 1.0 mole per kilogram dry soil can be employed. About 0.5 mole hydrogen peroxide is employed per kilogram dry soil in one embodiment. However, more or less peroxide may be used.

Ferric chelate and peroxide contact the target compound in the presence of water such as in an aqueous soil slurry. By "slurry" is meant sufficient water to moisten and saturate the soil, coating the soil particles, i.e., making mud. Sufficient water to actually suspend the soil particles is not necessary, but may be preferred in some embodiments. In one embodiment, a 1:1 by weight dry soil to water mixture is employed, but the amount of water in the slurry is not critical. As little as about 0.3 to 0.5 parts by weight dry soil to water may be employed, and much larger amounts of water may be employed.

As a practical matter, peroxide and chelate solutions are typically employed, and these can simply be added to the soil, so long as there is sufficient water present in the final mud to allow penetration of the ingredients. Alternatively, more concentrated peroxide and chelate solutions can be mixed into soil that has been recently moistened or watered. Alternatively, peroxide and chelate can be sprayed on freshly plowed earth; sunlight can speed degradation in these embodiments.

The degradation reaction employed in the method of the invention proceeds at the pH of the soil, which can range from about 3.5 to about 8, more typically around pH 6. It is an advantage of the invention that no acidification of the slurry is required. Degradation occurs even where the soil buffers the reaction. Moreover, in comparison experiments, the method of the invention was superior to the Fenton reagent itself.

It is another advantage of the invention that fairly low concentrations of peroxide and chelate may be employed, and yet provide relatively rapid degradation (i.e., within three hours or less). Peroxide to pesticide mass ratios can be low, i.e., on the order of about 5.6 to 8.5. Ozone is not required. Ligand concentration can approximate pesticide concentration. Soil remediation thus takes place under very mild conditions.

A further advantage of the invention is that a variety of organic compounds containing at least one oxidizable aliphatic or aromatic functional group can be degraded using the method of the invention. The method is especially useful for the degradation of soil pesticides. By the term "pesticide" is meant any compound used to destroy pests, including herbicides, fungicides, insecticides, rodenticides, and the like. Unsaturated pesticides, notably aromatic pesticides, are especially susceptible to degradation by the ferric chelates of this invention. Using the terminology of the *Farm Chemicals Handbook* 1990, example pesticides include, but are not limited to FLUCYTHRINATE/PHORATE (AASTAR™, 0,0-diethyl-S-((ethylthio)methyl)phosphorodithioate) and cyano(3-phenoxyphenyl)methyl-4-(difluromethoxy) alpha-(1-methyl-ethyl)benzene acetate); TEMOPHOS (ABATE™, O,O'-(thiodi-4,1-phenylene)bis (O,O-dimethyl phosphorothioate); bromopropylate (ACAROL™, isopropyl 4,4'-dibromobenzilate); ACETOCHLOR (ACENIT™, 2-chloro-N-ethoxymethyl-6'-ethylacet-o-toluidide), ACLONIFEN (2-chloro-6-nitro-3-phenoxy aniline); CARBOSULFAN (ADVANTAGE™, 2,3-dihydro-2,2-dimethyl-7-benzofuranyl ((dibutylamino)thio)methyl carbamate); TRICHLORONATE (AGRITOX™), AKTON™ (O,O-diethyl O-(2-chloro-1-(2,5-dichlorophenyl) vinyl) phosphorothioate); ALACHLOR (2-chloro-2'- 6'-diethyl-N-(methoxymethyl)-acetanilide), aldoxycarb (2-methyl-2-methylsulfonyl) propanyl O-((methylamino)carbonyl) oxime); clofopisobutyl (ALOPEX™, 2-(4-(4'-chlorophenoxy)-phenoxy)-isobutyl-propionate); ALPHA-CYPERNIETHRIN (cyclopropane-carboxylic acid, 3-(2,2-dichloroethenyl)-2,2-dimethyl-cyano (3-phenoxyphenyl) methyl ester); alpha-napthenylacetic acid, TRIFLUMURON (ALSYSTIN™, 2-chloro-N-(((4-(trifluoromethoxyphenyl)-aminocarbonyl) benzamide); CHLORAMBEN (AMIBEN™, 3-amino-2,5-dichlorobenzoic acid), DAEP (AMIPHOS™, O,O-dimethyl-S-2(acetylamino) ethyldithiophosphate); AMITRAZ (N-methylbis-(2,4-xylyliminomethyl) amine); AMLURE (propyl 1,4-benzodioxan-2-carboxylate), AMOBAN (diammonium ethylene bisdithiocarbamate); TETRASUL (ANIMERT V-101™, 4-chlorphenyl 2,4,5-trichlorophenyl sulfide); anthraquinone (9,10-anthraquinone); DIETHATYL ETHYL (ANTOR™, N-(chloroacetyl)-N-(2,6-diethylphenyl)glycine ethyl ester); IPSP (APHIDAN™, 0,0-diisopropyl-S-ethylsulfinyl methyl dithiophosphate); NIAGRAMITE (ARAMITE™, 2(p-tert butylphenoxy)-isopropyl 2-chloroethyl sulfite); MONOLINURON (ARESIN™, N-(4-chlorophenyl)-N'methoxy-N'-methylurea); GSFENVALERATE (ASANA™, (S)-cyano(3-phenoxyphenyl) methyl-(S)-4-chloro-alpha (1-methylethyl) benzene acetate); AAULAM (methyl sulfanilylcarbamate); TERBUCARB (AZAK™, 2,6-di-tert-butyl-p-tolyl methylcarbmnate); AZITHIRAM™ (bisdimethylaminocarbamoyl disulfide); BANAIR™ (2-methoxy-3,6-dichlorobenzene); BENZULTAP (BANCOL™, S,S'-2-dimethylaminotrimethylene di(benzene-thiosulphonate); dimethylamine salt of dicamba (BANVEL™, dimethylamine salt of 2-methoxy-3,6-dichlorobenzoic acid or dimethylamine salt of 3,6-dichloro-o-anisic acid); BENTAZON (BASAGRAN™, 3-isopropyl-1H-2,1,3-benzothiadiazin-4(3H)-one 2,2-dioxide); niclosamide (BAYLUSCID™, 5-chloro-N-(2-chloro-4-nitrophenyl)-2-hydroxybenzamide compound respectively with 2-aminoethanol (1:1)); PHOXIM (BATHION™, 2-(((diethoxyphosphinothioyl) oxy)imino) benzeneacetonitrile); CHLORPHOXIM (BAYTHION C™, 7(2-chlorophenyl)-4-ethoxy-3,5-dioxa-6-aza-4-phosphosphaoct-6-ene-8-nitrile-4-sulfide); BENAZOLIN (4-chloro-2-oxobenzo-thiazolin-3-ylacetic acid); BENDIOCARB™ (2,2-dimethyl-1,3-benzodixol-4-yl methylcarbamate); BENODANIL (2-iodo-Nphenylbenzamide); EXPORSAN (BENSULIDE™, S-(0,0-diisopropyl phosphorodithioate) ester of N-(2-mercaptoethyl) benzenesulfonamide); BTC (benzalkonium chloride, alkyl dimethyl benzylammonium chloride); benzomate (JMAF) (benzoximate, ethyl O-benzoyl 3-chloro-2,6 dimeth-oxybenzohydroximate); chlorfenprop-methyl (BIDSIN™, 2-chloro-3 (4-chlorophenyl) -methylpropionate); BIFENOX (methyl 5-(2,4-dichlorophenoxy) -2-nitrobenzoate); SULFOTEP (BLADAFUM™, tetraethyl thiodiphosphate); SULPROFOS (BOLSTAR™, O-ethyl-O-(4-(methylthio) phenyl)-S-propyl phosphorodithioate); BOMYL (dimethyl 3-hydroxy glutaconate dimethyl phosphate); FENOCARB (BPMC, 2-(1-methylpropyl) phenyl methylcarbamate); BRODIFACOUM™ (3-(3-(4'-bromo(1,1'-biphenyl)-4-yl)-1,2,3,4-tetrahydro-1-napthalenyl)-4-hydroxy-2H-1-benzopyran-2-one); BROMADIOLONE™ (3-(3-(4 '-bromo (1,1'-biphenyl)-4-yl)-3-hydroxy-1-phenylpropyl)-4-hydroxy-2H-1-benzopyran-2-one); BROMOPHOS™ (O(-4-bromo-2,5-dichlorophenyl)-O,O-dimethylphosphorothioate); bromophos-ethyl (O-(4-bromo-2,5-dichlorophenyl) O,O-diethylphosphorothioate); BROMOXYNIL™ (3,5-dibromo-4-hydroxybenzonitrile); BRONOPOL™ (2-bromo-2-nitropropan-1,3-diol); BUBAN 37™ (3',5'-dinitro-4'-(di-n-propylamino) acetophenone); BUTACARB™ (3,5-di-t-butylphenyl N-methylcarbamate); BUTACHLOR™ (2-chloro-2',6'-diethyl-N-(butoxy methyl) acetanilide); BUTONATE™ (O,O-dimethyl-2,2,2-trichloro-1-n-butyryl-oxethyl phosphonate); BUTYLATE™ (S-ethyl diisobutylthiocarbamate + inert safener); BUFENCARB (BUX™, amorphous SiO$_2$); PROMECARB (CARBAMULT™, 3-methyl-5-isopropylphenyl-N-methyl-carbamate); CARBARYL™ (1-naphthyl N-methylcarbamate); CARBETAMIDE™ (N-ethyl-2-(((phenylamino) carbonyl) oxy)propanamide(D)-isomer); CARBOFURRAN™ (2,3 dihydro-2,2-dimethyl-7-benzofuranyl methylcarbamate); CARBOXIM™ (5,6-dihydro-2-methyl-N-phenyl-1,4-oxathiin-3-carboxamide); BARBAN (CARBYNE™, 4-chloro-2-butynyl m-chlorocarbanilate); formetanate hydrochloride (CARZOL™, (3-dimethylamino-(methyleneimino phenyl)) N-methylcarbamate hydrochloride); pyrocatechol (CATECHOL™, O-Dihydroxybenzene); CELLOCIDIN™ (acetylene dicarboxamide); BEQUINOX (CEREDON™, 1,4-benzoquinone N'-benzoylhydrazone oxime); CHLOMETHOXYNIL™ (2,4-dichlorphenyl 3-methoxy-4-nitrophenyl-ether); CHLORANIL™ (2,3,5,6-tetrachloro-1,4-benzoquinone); CHLORBENSIDE™ (p-chlorobenzyl p-chlorophenyl sulfide); CHLORDIMEFORM™ (N'-(4-chloro-o-tolyl)-N,N-dimethyl-forma-midine); CHLORFENSON™ (4-chlorophenyl-4-chlorobenzene sulphonate); CHLORFENSULPHIDE™ (4-chlorophenyl 2,4,5-trichlorophenylazo sulphide); chlorflurecol-methyl ester (CHLORFLURENOL™, methyl 2-chloro-9-hydroxyfluorene-9-carboxylate, methyl-9-hydroxyfluorene-9-carboxylate); CHLORMEPHOS™ (S-chlormethyl-O,O- diethyl phosphoro-di-thioate); CHLOROPHACINONE™ (2-((p-chlorophenyl)phenylacetyl)-1,3 indandione); CHLOROPHENOXY PROPIONIC ACID™ (2-(3-chlorophenoxy)-propionic acid); CHLOROTOLURON™ (N'-(3-chloro-4-methylphenyl)-N-N'-dimethyl urea); CHLOROXYNIL™ (3,5-dichloro-4-hydroxybenzonitrile); CHLORPHOXIM™ (isopropyl m-chlorocarbanilate); CHLORPROPHAM™ (mixture of 3 isomers: (1) 0-2,5-dichloro-4(methylthio)phenyl phosphorothoic acid 0,0-diethyl ester (2) O,2,4-dichloro-5-(methylthio)phenyl phosphorothoic acid 0,0-diethyl ester (3) 0,4,5-dichloro-2-(methylthio) phenyl phosphorothoic acid 0,0-diethyl ester); CHLORNITROFEN (CNP™, 2,4,6-trichlorophenyl-4-nitrophenyl ether); CGA-92194 (CONCEP II™, N-(1,3-dioxolan-2-yl-methoxy)-iminobenzene-acetonitrile); CONEN™ (O-butyl-S-benzyl-S-ethyl phosphorodithioate); COUMOCHLOR™; 4-CPA™ (parachlorophenoxyacetic acid); ETHIOFENCARB (CRONETON™, 2-(ethylthiomethyl) phenyl methylcarbamate); (dimethyl phosphate of alpha-methylbenzyl 3-hydroxy-cis-crotonate); PROFENFOS (CURCACRON™, O-(4-bromo-2-chlorophenyl)-O-ethyl S-propyl phosphorthioate); CYANOFENPHOS™ (4-cyano-phenylethylphenyl phosphonothioate); CYANPHOS™ (O-4-cyano-phenyl O,O-dimethyl phosphoro-thioate); MEPHOSFOLAN (CYTROLANE™, 2-(diethoxyphosphinylimino)-4-methyl-1,3-dithiolane); 2,4-D™ ((2,4-dichlorophenoxy) acetic acid); DCPA (DACTHAL™, dimethyl-tetrachloroterephthalate); PTMD (DANIFOS™, S-((p-Chlorophenl)thio)methyl)O,O-diethyl phosphorothioate); FENSULFOTHION (DASANIT™, 0,0-diethyl 0-(4-methylsulfinyl)phenyl) phosphorothioate); 2,4-DB™ (4-(2, 4-dichlorophenoxy) butyric acid); DCNA™ (2,6-dichloro-4-nitroaniline); 2,4-DEB™ (2,4-dichlorophenoxyethyl benzoate); BUTIFOS (DEF™, S,S,S,-tributylphosphorotrithioate); 2,4-D acetate (DEFY™); DEMEPHION-S™ (0,0-dimethyl S-(2(methylthio)ethyl) phosphorothioate); DESMEDIPHAN™ ($C_{16}H_{16}N_2O_4$); napropamide (DEVRINOL™, 2-(a-naphthoxy)-N,N-diethylpropionamide); BROMSALANS (DIAPHENE™, a halogenated salicylanilide); dibutyl phthalate; DICAMBA™ (2-methoxy-3,6-dichlorobenzoic acid); DICHLOFENTHION™ (0-2,4-dichlorophenyl 0,0-diethylphosphoro-thioate); DICHLONE™; DICHLORPROP™ (2-(2,4-dichlorophenoxy)propionic acid); DICHLORPROP-P™ ((R)-2-(2,4-dichlorophenoxy) propionic acid); chloranocryl (DICRYL™); DIETHOFENCARB™ (isopropyl 3,4-diethoxyphenylcarbamate); DIMANIN™ (alkyldimethylbenzylammonium chloride); DIMETHOATE™ (0,0-dimethyl-S-(N-methylcarbamoylmethyl) phosphorodithioate); Dimethyl Phthalate™; DIPHENAMID™ (N,N-dimethyl-2,2-diphenylacetamide); DIPAN (DIPHENATRILE™); Diphenylamine™; DISULFOTON™ (0,0-diethyl S-(2-(ethylthio)-ethyl))phosphoro-dithioate); OXYDISULFOTON (DISYSTON S™, 0,0-diethyl S-(2-(ethylsulfinyl) ethyl) phosphorodithioate); DITALIMFOS™ (0,0-diethyl phthalimido-phosphonothioate); DITHIANON™ (5,10-dihydor-5,10-dioxonaphtho(2,3b)-p-dithiin-2,3-dicarbonitrile); DIURON™ (3-(3,4-dichlorophenyl)-1,1-dimethylurea + N'-(3,4-dichlorophenyl)-N,N-dimethylurea); 2-phenylphenol (DOWICIDE 1™, 99% orthophenylphenol); DOWICIDE A™ (97% Sodium o-phenylphenate); THIOCARBAZIL (DREPAMON™, S-benzyl N,N-di-sec-butylthiolcarbamate); FONOFOS (DYFONATE™, 0-ethyl-S-phenylethylphosphonodithioate); EDIFENPHOS™ (0,ethyl S,S-diphenyl phosphorodithioate); ISOXABEN (EL-107™, N-(3-(1-ethyl-1-methylpropyl)-5-isoxazolyl))-2,6-dimethoxybenzamide); DIOXACARB (ELOCRON™, 2-(1,3-dioxalan-2-yl)phenyl-N-methyl-carbamate); ENDOTHION™; alpha-chlorohydrin (EPIBLOC™, 3-chloro-1,2-propanediol); EPN™ (0-ethyl 0(4-nitrophenylphenylphosphonothioate); buturon (EPTAPUR™); EPTAM (EPTC™, S-ethyl dipropylthiocarbamate); ETHIOLATE™ (S-ethyl diethylthiocarbamate); ETHION™ (0,0,0,0-tetraethyl S,S-methylene bis (phosphorodithioate); ETHOPROP™ (0-Eehyl S,S-dipropyl phosphorodithioate); CHLORFENAC (FENATROL™, (2,3,6-trichlorophenyl) acetic acid); FENFURAM™ (2-methyl-furan-3-carboxanilide); FENOXA-PROP-ETHYL™ ((±)-ethyl 2-(4-((6-chloro-2-benzoxazolyl) oxy)-phenoxy)propanoate); FENOXYCARB™ (ethyl (2-(4-phenoxyphenoxy)ethyl)carbamaate); FENPROPIMORPH™ ((±)-cis-4-(3-tert-butylphenyl)-2-methylpropyl)-2,6-dimethylmorpholine); FENTHION™ (0,0-dimethyl 0-(3-methyl-4-(methylthio) phenyl)-phosphorothioate); FENURON™ (3-phenyl-1,1-dimethylurea); FENVALERATE™ ((RS)-alpha-cyano-3-phenoxybenzyl (RS)-2-(4-chlorophenyl)-3-methylbutyrate); FERBAM™ (ferric dimethyldithiocarbamate); ETHYCHLOZATE (FIGARON™, ethyl 5-chloro-3-(1H)-indazolyl-acetate); ETHOATE-METHYL (FITIOS B/77™, N-ethylamide of 0,0-dimethyl dithiophosphorylacetic acid); flurecol-n-butylester (FLURECOL™, n-butyl-9-hydroxyfluorene-9-carboxylate); TRIBUFOS (FOLEX 6EC™, S,S,S-tributyl phosphotrithioate); OMETHOATE (FOLIMAT™, 0,0-dimethyl S-(2-(methylamino)-2-oxothyl)) phosphorothioate); FURALAXYL (FONGARID™, methyl N-2,6-dimethylphenyul-N-furoyl (2)-alaninate); PHOSETHYL A1 (FOSETYL-A1™, aluminum tris(0-ethyl phosphonate); 3-CPA (FRUITONE CPA™, 2-(3-chlorophenoxy) propionic acid); FUBERIDAZOLE (FIBERIDAZOL™, 2(2'-furyl)-1H-benzimidazole); FUJITHION™ (S-(p-chlorophenyl) 0,0-di-methyl phosphoro-thioate); BENALAXYL (GALBEN™, methyl-N-phenylacetyl-N-2,6-xylylaninate); GALLIC ACID™); BENAZOLIN (GALTEK™, 4-chloro-2-oxobenzothiazolin-3-ylacetic acid); BENZTHIAZURON (GATNON™, N-2-benzothiazoly)-N'-methylurea); PHORAZETIM (GOPHACIDE™, 0,0-bis(p-chlorophenyl) acetimodyl-phosphoramidothioate); GRISEOFULVIN™ (7-chloro-4,6-dimethoxycoumaran-3-one-2-spiro-1-(2'-methoxy-6'methylcyclohex-2'-en-4'-one); EXD (HERBISAN #5™, diethyl dithiobis (thinoformate); HEXACHLOROPHENE™ (2,2'methylene bis(3,4,6-trichlorophenol); DICLOFOP-METHYL (HOELON 3EC™, 2-(4-(2',4'-dichlorophenoxy)-phenoxy) methyl propanoate); isothioate (HOS-DON™); ALLYXYCARB (HYDROL™, 4-Diallylamino-3,5-dimethylphenyl-N-methylcarbamate); IBP™ (0,0-diisopropyl-S-benzyl thiophosphate); Indole-3-Acetic Acid™; IBA (indole-3-butyric Acid™, indole-3-butyric Acid); IOXYNIL™ (4-hydroxy-3,5-diiodobenzonitrile); PROPHAM (IPC™, isopropyl carbanilate); ISOFENPHOS™ (1-methylethyl 2-(ethoxy((1-methylethyl)-amino)phosphinothioyl)oxy)benzoate); Isopropyl Ester 2,4-D™ (2,4-dichlorophenoxyacetic acid, isopropyl ester); ISOPROTURON™ (N-(4-isopropylphenyl)-N',N'-dimethylurea); BUTILATE™; ISOXATHION (KARPHOS™, 0,0-diethyl-O-(5-phenyl-3-isoxazoly) phosphorothioate); KARSIL™ (N-(3,4-Dichlorophenyl)-2-methyl pentanamide); PRONAMIDE (KERB™, 3,5-dichloro-N-(1,1-dimethyl-2-propynyl) benzamide); (2-propynl (E,E)-3,7,11-trimethyl-2,4-dode-cadienoate);

LAN-DRIN™ (Approx. 4:1 ratio of 3,4,5- and 2,3,5- isomers of trimethylphenyl methylcarbamate); ALACHLOR (LASSO™, 2-chloro-2',6'-diethyl-N-(methoxymethyl)-acetanilide); FEN-AMINOSULF (LESAN™, sodium (4-(dimethylamino)phenyl) diazene sulfonate); LINURON™ (3-(3,4-dichlorophenyl)-1-methoxy-1-methylurea); DIFENOXURON (LIRONION™, N-4-(p-methoxyphenoxy)-phenyl)-N',N'-dimethylurea); MALATHION™ (0,0-dimethyl phosphorodithoate of diethyl mercaptosuccinate); chlorbromuron (MALORAN™, 3-(4-bromo-3-chlorphenyl)-1-methoxy-1-methylurea); aminocarb (METACIL™); MCPA™ ((4-chloro-2-methylphenoxy) acetic acid); MCPB™ (4-((4-chloro-o-tolyl)oxyl) butyric acid); MCPCA™ (2'-chloro-2-(4-chloro-o-tolyoxy) acetanilide); MCPP (Potassium Salt)™ (potassium salt of 2-(2-methyl-40-chlorophenoxy) propionic acid); ME-CARPHON™ (S-(N-methoxycarbonyl-N-methylcarbamoylmethyl) dimethyl phosphonothiothioate); MCPP (MECOPROP™, 2-(4-chloro-2-methylphenoxy) propionic acid); MECOPROP-P™ ((R)-2-(4-chloro-2-methylphenoxy)propionic acid); XYLYLCARB (MEOBAL™, 3,4-dimethylphenylmethylcarbamate); MEPRONIL™ (3'-isopropoxy-2-methylbenzanilide); MET-ALDEHYDE™ (polymer of acetaldehyde); METAN-SODIUM™ (sodium N-methyldithiocarbamate); demeton methyl (METASYSTOX™, S-(2-ethylthioethyl)0,0-dimethyl phosphorothioate); DEMETON-S-METHYL (METASYSTOXI™, S-(2(ethylthio)ethyl)0,0-dimethylphosphoro-thioate); demeton-S-methyl sulfoxid (METASYSTOX-R™, s-(2-ethylsulfinyl) ethyl)0,0-di-methyl); METHIOCARB™ (3,5-dimethyl-4-(methylthio) phenol methylcarbamate); METHIURON™ (1-(m-methyl-phenyl)-3,3-dimethylthio-urea); METHYL EUGENOL™ ((4-allyl-1,2dimethoxybenzene); METOBROMURON™ (3-(4-bromophenyl)-1-methoxy-1-methylurea); METO-LACHLOR™ (2-chloro-N-(2-ethyl-6-methylphenyl)-N-(2-methoxy-1-methylethyl)acetamide); METOX-URON™ (N-(3-chloro-4-methoxyphenyl)-N,N-dimethyl-urea); MEXACARBATE™ (4-dimethylamino-3,5-xylyl N-methylcarbamate); MIBEX™ (4-chlorophenyl-2,4,5-trichlorophenyl-azosulfide mixed with 1,1-bis-(4-chlorophenyl) ethanol); isoprocarb (MIPC™, 2-(1-methylethyl)phenyl methylcarbamate); ACN (MOGETON G™, 2-amino-3-chloro 1,4-naphthoquinone); TOPHOS™ (dimethyl-(E)-1-methyl-2-(methylcarbomyl)-vinyl phosphate); MONURON™ (3-(p-chlorophenyl)-1,1-dimethylurea); MTMC™ (m-tolyl-N-methylcarbamate); Napthalene™; NAD (NAP-THALENEACETAMIDE™); 1-Naphthaleneacetic Acid™; NAPTALAM™ (sodium-2-(1-napthalenylamino) carbonyl) benzoate); NEBURON™ (1-n-butyl-3-(3,4-dichlorophenyl)-1-methylurea); DIA-MIDFOS (NELLITE™); FENAMIPHOS (NEMACUR™, ethyl 3-methyl-4-(methylthio)phenyl (1-methylethyl) phosphoramidate); CPCBS (NEOSAP-PIRAN™, p-chlorophenyl p-chlorobenzenesulfonate); DCPM (NEO-TRAN™, bis (p-chlorophenoxy)methane); FOSME-THILAN (NEVI-FOS™, S-(N-(2'-chloro-butyranilido-methyl))-0,0-dimethyl phosphorodithoate); N-phenyl phtalimic acid (NEVIROL™, 2-aminocarbonylphenyl-benzoic acid); NIACIDE™ (mercaptobenzothiazole); NITROFEN™ (2,4-dichlorophenyl-p-nitrophenyl ether); N,N-Diethylbenzamidem (N,N-diethylbenzamide); iodofen-phos (NUVANOL N™, 0,0-dimethyl-0-(2,5-dichloro-4-iosphenyl) phosphorthioate); OFURACE™ (2-chloro-N-(2, 6-di-methylphenyl)-N-(tetrahydro-2-oxo-3-furanyl) acetamide); DIMETHACHLON (OHRIC™, N-(3,5-dichlorophenyl)succinimide); ORBENCARB™ (S-(2-chlorobenzyl)-N,N-diethylthiolcarbamate); OVEX™ (p-chlorophenyl-p-chlorobenzenesulfonate); OXY-DIXYL™ (2-methoxy-N-(2-oxo-1,3-oxazolidin-3yl) acet-2',6'-xylidide); OXYCARBOXIN™ (5,6-dihydro-2-methyl-N-phenyl-1,4-oxathiin-3-carboxamide-4,4-dioxide); FENOTHIOCARB (PANO-CO™, S-(4-phenoxybutyl)-N, N-dimethyl thocarbamate); (pentachlorophenol); PHEN-CAPTON™ (0,0-diethyl S-(2,5-dichlorophenylthio-methyl) phosphorodithoate); PHENMEDIPHAM™ (methyl-m-hydroxycarbanilate-m-methylcarbanilate ester); PHE-NOTHIOL™ (S-ethyl(4-chloro-0-tolyoxy) thioacetate); PHENTHOATE™ (0,0-dimethyl S-(alpha-ethoxycarbonylbenzyl)-phosphorodithoate); PHORATE™ (0,0-diethyl S-((ethylthio) methyl) phos-phorodiothioate); PHOSALONE™ (S-((6-chloro-2-oxo-3(2H)-benzoxazolyl)-methyl) 0,0-diethyl phosphordithioate); PHOSMET™ (N-(mercaptomethyl) phthalimide S-(0,0-dimethylphosphorodithioate); LEPTHOPOS (PHOSVEL™, 0-(4-Bromo-2,5-dichlorophenyl) 0-methyl-phenyl-phosphonothioate); PIPERONYL BUTOXIDE™ (alpha-(2-(2-butoxyethoxy)ethoxy)-4,5-methylenedioxy-2-propyltoluene); GLY-PHOSINE (POLARIS™, N,N-bis (phosphonmethyl) glycine); MONA-LIDE (POTABLAN™, N-(4-chlorophenyl)-2,2-dimethylvaleramide); CHLOR-THIAMID (PREFIX™, 2,6-dichlorothiobenzamide); PROTHIO-CARB (PREVICUR™, ethyl-N-(3-dimethylamino-propyl)-thiolcarbamate) hydrochloride); METHAZOLE (PROBE™, 2-(3,4-di-chlorophenyl)-4-methyl-1,2,4-oxadiazolidine-3,5-dione); PROPACHLOR™ (2-chloro-N-isopropylacetanilide); PROPAMOCARB™ (propyl (3-(dimethylamino)propyl) carbamate monohydrochloride); PROPANIL™ (N-(3,4-dichlorophenyl) propionamide); PROPETAMPHOS™ ((E)-0-2-isopropoxy-carbonyl-1-methylvinyl 0-methyl ethylphosphoramidothioate); PROPOXUR™ (2-(1-methlyethoxy)phenyl methylcarbamate); 1,8-naphthalic anhydride (PROTECT™); PRYNCHLOR™ (2-chloro-N-(1-methyl-2-propynyl)acetanilide); CHLORFENETHOL (QUIK-RON™, 1,1-bis(4-chlorophenyl)ethanol); QUINA-ZIMID™ (p-benzoquinone monosemicarbazone); CDAA (RANDOX™, N,N-diallyl- 2-chloroacetamide); RHODE-THANIL™ (3-chloro-4-(ethylamino)-phenyl thiocyanate); TOLCLOFOS (RIZOLEX™, 0-2,6-dichloro-4-methylphenyl 0,0-dimethyl phosphorothioate); sirmate (ROW-MATE™, 3,4-and 2,3-dichlorobenzyl N-methyl-carbamate); DI-OXABENZOFOS (SALITHION™, 2-methoxy-4H-1,3,2-benzodioxaphosphorin-2-sulfide); C-10015 (SAPRECON C™); DICHLOZOLINE (SCLEX™, 3-(3,5-dichlorphenyl)-5,5-dimethyl oxazoline-dione-2,4); SESONE™ (sodium 2,4-dichlorophenoxyethyl sulfate); pyracarbolid (SICAROL™); SILVEX™ (2-(2,4,5-trichlorophenoxy)propionic acid); SODIUM PEN-TACHLOROPHENATE™; SOPHAMIDE™ (0,0-Dimethyl s-(N-methoxymethyl)carbamoylmethyl) phosphorodithoate); EPBP (S-SEVEN™, 0-ethyl-0-(2,4-di chlorophenyl)-phosphonothionate); BENZOYLPROP ETHYL (SUFFIX™, ethyl N-benzoyl-N-(3,4-dichlorophenyl)-DL-alaninate); ESFENVALERATE (SUMI-ALPHA™, (S)-alpha-Cyano-3-phenoxybenzyl (S)-2-(4-chlorophenyl)-3-methylbutyrate); CYANOFENPHOS (SURECIDE™, 0-P-cyanophenyl 0-ethyl phenyl-phosphorothioate); SWEP™ (methyl-N-(3,4-dichlorophenyl) carbamate); 2,4,5-T (2,4,5-trichlorophenoxy-acetic acid); CHLOROXURON (TENORAN™, 3-(p-(p-chlorophenoxy) phenyl)-1,1-di-methylurea); CHLORONEB (TERRANEB SP™, 1,4-dichloro-2,5-dimethoxybenzene); TETRACHLORVINPHOS™ ((Z)- isomer of the compound 2-chloro-1(2,4,5-trichlorophenyl)-vinyl dimethyl phosphate); benthiocarb (THIOBENCARB™, S-((4-chlorophenyl)methyl) diethylcarbamothioate); THIOMETON™ (S-(2-(ethylthio) ethyl) 00-dimethyl phos-phorodithioate); TIBA™ (2,3,5-triodobenzoic acid compound with N-methylmethanamine); PEBULATE (TILLAM™, S-propyl butylethylthiocarbamate); 2,3,6-TBA (trichlorobenzoic acid); TRIMETHACARB™ (3,4,5- + 2,3,5- isomers of trimethylphenyl methyl carbamate); CARBOPHENOTHION (TRITHIOM™); PHENISOPHAM (3-isopropoxycarbonyl-aminophenyl-N-ethyl carbanilate); WARFARIN™ (3(a-acetonylbenzyl)-4-hydroxycoumarin); XMC™ (3,5-xylyl N-methyl carbamate); and ZYTRON™ (0-(2,4-dichlorophenyl) 0'-methyl N-isopropylphosphoroamidothioate).

In preferred embodiments, the target compound is destroyed and substantially degraded, i.e., either mineralized or at least about 50%, and in some cases about 75%, degraded. It is an advantage of the invention that, since the method utilizes soil that generally contains microorganisms, biological degradation of reaction by-products often continues even after the chemical degradation of the invention has ceased. Substantial degradation or substantial mineralization of soil contaminants can thus be achieved in many embodiments.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Example 1

In this example, soil containing herbicide is decontaminated using the method of the invention. Briefly stated, soluble ferric chelates and hydrogen peroxide are used to degrade metolachlor and 2,4-dichlorophenoxyacetic acid (2,4-D) in soil contaminated with the herbicides.

Soil that was coarse and loamy, mixed mesic, Typic Dystrochrepts was collected from 0–15 cm in an uncontaminated spot at Lockwood Farm, the Connecticut Agricultural Experiment Station, Hamden, Conn. The soil was passed through a 2 mm sieve and stored at 4° C. at field moisture. The soil composition was 560 g/kg sand, 360 g/kg silt, 80 g/kg clay, and 15.7 g/kg organic carbon. A 1:1 suspension of soil in water exhibited a pH of about 5.7.

Prior to degradation experiments, herbicide was added to the soil and incubated for 24 hours at room temperature in a slurry having a soil to water ratio of 2.5:1, weight/volume. Herbicide addition was carried out in the following manner. 2,4-D (ring uniformly labelled- and carboxy-$^{14}$C, obtained from Sigma, St. Louis, Mo.) was added as an aqueous solution of the sodium salt at pH ~6 to each replicate vial containing soil. Metolachlor-spiked soil was prepared in batch by adding metolachlor (obtained from Crescent Chemical, Hauppauge, N.Y.) in an acetonitrile solution (1:1 acetonitrile-soil) and then rotary-evaporating the resulting slurry at 50° C. for 1 hour to remove the solvent. Then the appropriate amount of water was added and, after homogenization, the moist soil weighed out into individual vials.

Iron chelate solutions were made by directly mixing aqueous solutions of $Fe^{+3}$ and the corresponding ligand. Aqueous $Fe^{+3}$ was prepared fresh daily by dissolving anhydrous $Fe(ClO_4)_3$ (GFS Chemicals) in 0.1 M perchloric acid. The Fe-chelate solutions were adjusted to pH 6 with NaOH.

After incubation of the soil with herbicide, 1 mL freshly-prepared Fe-chelate solution at pH 6 was added, followed by 0.5 ml $H_2O_2$. Controls had the equivalent volume added as water. The final soil-solution ratio was 1:1 (weight/volume). Reagent and herbicide concentrations varied with experiment as set out below.

Reactions were carred out in 40 ml screw cap vials on an orbital shaker at room temperature (~20 to 25° C.). For trapping $^{14}CO_2$ from labelled compounds, a center well containing 0.3 ml of aqueous 1 mole/liter ethanolamine was suspended in the vial headspace. Timecourse data were obtained by analyzing replicate vials. For experiments dealing with chelate behavior in the absence of peroxide and herbicide, 2.5 g soil were mixed with 2.5 mL Fe-chelate or free ligand solution.

To determine "dissolved" iron, the soil suspension was centrifuged at high speed to remove particles below 0.2 um diameter. Iron was determined in the supernatant by inductively coupled plasma atomic emission spectroscopy (Fisons model ARL-3520).

Extraction of herbicides was carried out by adding 25 ml methanol to the suspension, shaking for 2 hours, and centrifuging to clarity. Quantitation of the supernatant was carred out by liquid chromatography on a 25 cm Spherisorb OBS-2 C-18 reverse-phase column (Alltech) using UV detection at 230 nm. The mobile phase was methanol-water-trifluoroacetic acid in the ratio 70:30:0.02 for 2,4-D, and 70:30:0 for metolachlor, and the flow rate was 1.5 ml/min. Extraction recovery from soil incubated 24 hours was 85–100%. Values in the tables below are uncorrected for recovery.

Chloride was determined in supernatant samples using a chloride selective electrode. For these experiments, it was necessary to use soil that had been pre-rinsed with distilled water to lower background interferences to acceptable levels. Results set out below are corrected for background readings in identically treated controls which contained all components except herbicide. Radioactive fractions resulting from degradation of labelled 2,4-D were determined by liquid scintillation counting using the external standard method: (1) headspace $^{14}CO_2$, by counting the center well and its contents in 15 ml OptiFluor™ scintillation cocktail (Packard Instrument Co); and (2) total soluble $^{14}C$ (2,4-D and its soluble degradation products), by counting a 0.5 ml aliquot of methanol soil extract in 15 ml OptiFluor™.

The sorption of herbicides in the absence of reagents was determined prior to performing the degradation reactions. The results in Table 1 below shows that 2,4-D and metolachlor exhibit different sorption behavior.

The ratio $C_s/C_a$ of sorbed to aqueous 2,4-D after 24 h equilibration with moist soil (2.5:1 soil-water) and just after the start of a putative degradation experiment (water added to give a final 1:1 suspension) was 0.19 L/kg; three hours later, the ratio diminished slightly to 0.11 L/kg as re-equilibration occurred in response to the added water. Thus, only about 10–16% of total 2,4-D was sorbed. Metolachlor, on the other hand, gave an initial sorbed to aqueous ratio of about 8 L/kg, or about 89% of total metolachlor sorbed.

TABLE 1

Phase Distribution of Herbicides in 1:1 Soil Suspensions.

| Compound | Application Rate mg/kg | Time* h | $C_s/C_a$† L/kg |
|---|---|---|---|
| 2,4-D | 1580 | 0 | 0.19 ± 0.02 |
| 2,4-D | 1580 | 3 | 0.11 ± 0.02 |
| Metolachlor | 3020 | 0 | 8.0 ± 1.3 |

*After 24 h pre-equilibration and from beginning of putative degradation experiment; time for centrifugation and sampling (~20 min) is not included.
†Solid to agueous phase concentration ratio; mean and standard deviation of 4–5 replicates.

The behavior of the chelates in the absence of herbicide or peroxide was then examined. The chelates compared were hydroxyethyleniminodiacetate (HEIDA) and nitrilotriacetate (NTA) obtained from J. T. Baker, and picolinic acid (PIC), rhodizonic acid (RHO), and gallic acid (GAL) obtained from ICN Biochemicals. Fe-chelates were added to soil suspensions at initial concentrations of 1 and $10 \times 10^{-3}$ moles/L and mixed for 1 and 16 hours. Table 2 below indicates that much of the Fe became adsorbed to soil particles. Adsorption was usually little changed after 1 h. GAL, HEIDA and NTA were more competitive with soil than PIC and RHO. At the $10^{-2}$ moles/L level, the former group left about 9 to 34% Fe in solution, while the latter pair left $\leq 2$% in solution.

TABLE 2

Soluble Iron Remaining After Addition of Fe(III) Chelates to Soil Suspensions.

| | Concentration ($10^{-3}$ moles/L) | | |
|---|---|---|---|
| Fe-Chelate | Initial | After 1 h | After 16 h |
| GAL | 1.0 | 0.07 | 0.07 |
| GAL | 10.0 | 1.2 | 2.0 |
| HEIDA | 1.0 | 0.05 | 0.05 |
| HEIDA | 10.0 | 0.9 | 1.1 |
| NTA | 1.0 | 0.06 | 0.12 |
| NTA | 10.0 | 3.4 | 3.4 |
| PIC | 1.0 | 0.006 | 0.003 |
| PIC | 10.0 | 0.2 | 0.2 |
| RHO | 1.0 | 0.05 | 0.06 |
| RHO | 10.0 | <0.003 | <0.003 |

Table 3 indicates that free ligands GAL, HEIDA and NTA appear to be capable of extracting native iron from the soil. This is advantageous in the practice of the invention. However, the resulting solution-phase iron concentrations are lower than when the Fe(III) chelate itself was added at the same ligand concentration.

TABLE 3

Native Iron Solubilized by Free Ligands.

| | $10^{-3}$ mole/L | |
|---|---|---|
| Free Ligand | Initial Ligand Concentration | Fe in Solution After 3 Hours |
| water only | | 0.1 |
| GAL | 10.0 | 0.6 |
| HEIDA | 10.0 | 0.06 |
| NTA | 10.0 | 0.2 |

Soil suspensions equilibrated for 24 hours with 2000 mg/kg of 2,4-D were treated with 0.1 mole/kg $H_2O_2$ and $1 \times 10^{-2}$ mole/kg chelate or the corresponding free ligand. In these and the below-described experiments, the pH did not deviate much from the natural pH of the suspension (~pH 5.7) during the reaction. Table 4 shows that incomplete reaction was observed in all cases. However, the Fe-chelate systems (36–65% removal of 2,4-D) were superior to the free ligand alone (0–3% removal). The data show that free ligand does not extract enough native iron from the soil to achieve high levels of degradation. However, solubilization of sufficient iron may be possible in iron-rich soils.

Table 4

Comparison of Fe(III) Chelate with Free Ligand for Degradation of 2,4-D.

| Chelate or Free Ligand | Incubation Time (h) | 2,4-D Remaining (% of initial) |
|---|---|---|
| GAL | 18 | 97 |
| Fe-GAL | 18 | 64 |
| HEIDA | 3 | 110 |
| Fe-HEIDA | 3 | 51 |
| NTA | 3 | 97 |
| Fe-NTA | 3 | 35 |

Table 5 shows the effects of $H_2O_2$ on iron-chelate-catalyzed degradation of 2,4-D (2000 mg/kg) carried out for 3 hours at an iron-chelate concentration of 0.01 mole/kg; where indicated, standard deviations expressed are from 3 replicates.

TABLE 5

Degradation of Herbicides by Fe(III)-Chelates and Hydrogen Peroxide after 3 Hours.

| Compound | Chelate | $[H_2O_2]$ (mole/kg) | Herbicide Remaining (% of Initial) |
|---|---|---|---|
| 2,4-D | none | 0.5 | 100 ± 1 |
| 2,4-D | Fe-GAL | 0.1 | 80.5 |
| 2,4-D | Fe-GAL | 0.5 | 57 ± 10 |
| 2,4-D | Fe-GAL | 1.0 | 55.5 ± 5 |
| 2,4-D | Fe-HEIDA | 0.1 | 51.3 |
| 2,4-D | Fe-HEIDA | 0.5 | 2.5 ± 0.5 |
| 2,4-D | Fe-HEIDA | 1.0 | 3 ± 1 |
| 2,4-D | Fe-NTA | 0.1 | 34.7 |
| 2,4-D | Fe-NTA | 0.5 | 2.5 ± 0.5 |
| 2,4-D | Fe-NTA | 1.0 | 1.5 ± 0.5 |
| Metolachlor | none | 0.5 | 98 ± 8 |
| Metolachlor | Fe-NTA | none | 101 ± 7 |
| Metolachlor | NTA | none | 110 ± 20 |
| Metolachlor | Fe-NTA | 0.5 | 7.4 ± 1.2 |

No reaction occurred at 0.5 mole/kg $H_2O_2$ in the absence of chelate. Of the chelates, Fe-GAL was inferior to Fe-HEIDA and Fe-NTA at all three peroxide levels. Fe-HEIDA and Fe-NTA gave nearly complete removal at both the 0.5 and 1.0 mole/kg levels of $H_2O_2$, but significantly less at the 0.1 mole/kg level.

Table 5 also shows degradation results obtained with metolachlor (3100 mg/kg), tested using Fe-NTA and at 0.5 mole/kg $H_2O_2$. Metolachlor was stable in the presence of the single components $H_2O_2$, Fe-NTA, or free NTA. However, about 92% was removed in the presence of both Fe-NTA and $H_2O_2$. Evidently, even compounds like metolachlor that are initially sorbed react.

Mineralization was determined by measuring chloride released from each compound and $^{14}CO_2$ from labelled 2,4-D. Chloride release from 2,4-D was stoichiometric (106±4% of theoretical, 4 replicates) when soil suspensions were treated with Fe-NTA at 0.5 mole/kg $H_2O_2$. Chloride release from metolachlor was less extensive (29±3% of theoretical, 5 replicates) under the same conditions.

The distribution of carbon degradation products from 2,4-D was determined using ring- and carboxy-$^{14}C$-labelled 2,4-D. The results are presented graphically in FIG. 1. Untreated controls gave no $^{14}CO_2$ and 93–96% recovery of $^{14}C$ in the methanol extract of the soil. A small fraction of the 2,4-D carbon (1 to 27%) was mineralized to $CO_2$, depending on ligand and $^{14}C$ position in the molecule. The degree of ring carbon mineralization increased in the order GAL<HEIDA<NTA. The degree of car-boxyl carbon mineralization increased in the order: GAL<HEIDA<NTA. Mineralization of both labelled forms increased from 0.1 to 0.5 mole/kg $H_2O_2$, but then decreased slightly with further peroxide increase to 1.0 mole/kg.

Extractable $^{14}C$ decreased with $H_2O_2$ concentration and followed the order GAL>HEIDA>NTA. At 0.1 mole/kg $H_2O_2$, much of the extractable $^{14}C$ was 2,4-D itself, as is obvious from the results set out in Table 5. The remaining unrecovered radioactivity, presumably strongly bound degradation products, increased with $H_2O_2$ concentration and in the order GAL<HEIDA<NTA. Overall, using NTA as a chelate resulted in the greatest conversion of 2,4-D to $CO_2$ and strongly bound products, and the lowest to extractable products.

Example 2

This example compares Fe(III)-NTA degradation of 2,4-D and metolachlor with degradation by Fe(II) perchlorate using methodology described in Example 1 above and shows that Fe(III)-NTA/$H_2O_2$ is superior to Fenton's reagent itself for the treatment of contaminated soil.

Initial concentrations of both herbicides was 2000 mg/kg. Iron and NTA concentrations were each 0.01 mole/kg, and hydrogen peroxide concentration was 0.5 mole/kg. Three replicate reactions were run. The results are given in Table 6 below.

TABLE 6

Comparison of Fe(III)-Chelates with $Fe^{+2}$

| | Amount Remaining After 3 Hours (% of Initial) | |
|---|---|---|
| | 2,4-D | Metolachlor |
| $Fe^{+2} + H_2O_2$ | 39 ± 4 | 93 ± 12 |
| Fe(III) – NTA + $H_2O_2$ | 0.7 ± 0.6 | 13 ± 2 |
| $Fe^{+2}$ + NTA + $H_2O_2$ | (not tested) | 16 ± 2 |

Simple $Fe^{+2}$ removed 61% of 2,4-D and only 7% metolachlor, whereas Fe(III)-NTA removed 93% of 2,4-D and 87% metolachlor.

Addition of NTA along with $Fe^{+2}$ was about as effective as Fe(III)-NTA in mediating the removal of metolachlor. Since ferrous ion is oxidized by peroxide within milliseconds, this probably indicates that the ion became converted in situ to the active Fe(III)-chelate.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the claims that follow. The claims are meant to cover the claimed components and steps in any sequence which is effective to meet the objectives there intended, unless the context specifically indicates the contrary.

What is claimed is:

1. A method for decontaminating soil containing a soil contaminating organic compound having at least one oxidizable aliphatic or aromatic functional group comprising contacting the soil with an active, soluble ferric chelate selected from the group consisting of ferric nitrilotriacetate, ferric hydroxyethyleniminodiacetate, and combinations thereof, and a peroxide compound in amounts effective to achieve oxidation of the soil contaminating organic compound in the presence of water at the pH of the soil, and wherein least about 3% of said ferric chelate does not sorb to the soil, and wherein said soil is in the form of an aqueous soil slurry comprising mud containing sufficient water to moisten and saturate said soil.

2. The method according to claim 1, wherein at least about 5% of the ferric chelate does not sorb to the soil.

3. A method according to claim 2 wherein at least about 10% of the ferric chelate does not sorb to the soil.

4. A method according to claim 1 wherein the peroxide is hydrogen peroxide.

5. A method according to claim 4 wherein about 0.3 to 1.0 mole hydrogen peroxide is employed per kilogram dry soil.

6. A method according to claim 5 wherein about 0.5 mole hydrogen peroxide is employed per kilogram dry soil.

7. A method according to claim 5 wherein about 0.01 mole ferric chelate is employed per kilogram dry soil.

8. The method of claim 1, wherein said soil slurry comprises from about 2.5 to about 0.3 parts by weight dry soil per by weight water.

9. A method according to claim 1 wherein the peroxide is hydrogen peroxide and the ferric chelate is ferric nitrilotriacetate.

10. A method for decontaminating soil containing an organic pesticide containing at least one oxidizable aliphatic or aromatic functional group comprising contacting the soil with a ferric chelate and hydrogen peroxide in amounts effective to achieve oxidation of the organic pesticide in an aqueous slurry at the pH of the soil, wherein said ferric chelate is selected from the group consisting of ferric nitrilotriacetate, ferric hydroxy-ethyleniminodiacetate, ferric gallate, and mixtures thereof, and wherein at least about 3% of said ferric chelate does not sorb to the soil, and wherein said soil is in the form of an aqueous soil slurry comprising mud containing sufficient water to moisten and saturate said soil.

11. A method according to claim 10 wherein about 0.01 mole ferric chelate and about 0.5 mole hydrogen peroxide is employed per kilogram dry soil.

12. A method according to claim 10 wherein the ferric chelate is ferric nitrilotriacetate.

13. A method according to claim 10, wherein at least about 5% of the ferric chelate does not sorb to the soil.

14. A method according to claim 13 wherein at least about 10% of the ferric chelate does not sorb to the soil.

15. The mothod of claim 10, wherein said soil slurry comprises from about 2.5 to about 0.3 parts by weight dry soil per part by weight water.

16. A method for decontaminating soil containing a soil contaminating organic compound having at least one oxidizable aliphatic or aromatic functional group comprising contacting the soil with an active, soluble ferric chelate selected from the group consisting of ferric nitrilotriacetate, ferric hydroxyethyleniminodiacetate, and combinations thereof, and a peroxide compound in amounts effective to achieve oxidation of the soil contaminating organic compound in the presence of water at the pH of the soil, and wherein at least about 3% of said ferric chelate does not sorb to the soil, and wherein said soil is in the form of an aqueous soil slurry comprising mud containing from about 2.5 to about 0.3 parts by weight dry soil per part by weight water.

17. The method of claim 16, wherein at least about 5% of the ferric chelate does not sorb to the soil.

18. The method of claim 17, wherein at least about 10% of the ferric chelate does not sorb to the soil.

19. The method of claim 16, wherein said peroxide compound is hydrogen peroxide.

20. The method of claim 19, wherein about 0.3 to 1.0 mole hydrogen peroxide is employed per kilogram dry soil.

21. The method of claim 20, wherein about 0.5 mole hydrogen peroxide is employed per kilogram dry soil.

22. The method of claim 20, wherein about 0.01 mole ferric chelate is employed per kilogram dry soil.

23. The method of claim 16, wherein said peroxide compound is hydrogen peroxide and said ferric chelate is ferric nitrilotriacetate.

24. A method for decontaminating soil containing an organic pesticide containing at least one oxidizable aliphatic or aromatic functional group comprising contacting the soil with a ferric chelate and hydrogen peroxide in amounts effective to achieve oxidation of the organic pesticide in an aqueous slurry at the pH of the soil, wherein said ferric chelate is selected from the group consisting of ferric nitrilotriacetate, ferric hydroxy-ethyleniminodiacetate, ferric gallate, and mixtures thereof, and wherein at least about 3% of said ferric chelate does not sorb to the soil, and wherein said soil is in the form of an aqueous soil slurry comprising mud containing from about 2.5 to about 0.3 parts by weight dry soil per part by weight water.

25. The method of claim 24, wherein about 0.01 mole ferric chelate and about 0.5 mole hydrogen peroxide are employed per kilogram dry soil.

26. The method of claim 24, wherein said ferric chelate is ferric nitrilotriacetate.

27. The method of claim 24, wherein at least about 5% of the ferric chelate does not sorb to the soil.

28. The method of claim 27, wherein at least about 10% of the ferric chelate does not sorb to the soil.

* * * * *